Patented Aug. 31, 1948

2,448,127

UNITED STATES PATENT OFFICE 2,448,127

METHOD OF REMOVING HALOGEN FROM COUMARONE-INDENE POLYMERS

Herbert Muggleton Stanley, Tadworth, Francis Edward Salt, Banstead, and James Frederick Williams, Tunbridge Wells, England, assignors to The Distillers Company, Limited, Edinburgh, Scotland, a British company No Drawing. Application July 13, 1945, Serial No. 604,986. In Great Britain June 6, 1944

10 Claims. (Cl. 260—80)

This invention is for improvements in or relating to the manufacture of polymeric substances and is directed to solving the problem of removing small amounts of hydrogen halide which may be present in the polymers.

Unsaturated materials such as indene and/or coumarone may be polymerised in solution in other hydrocarbons under the influence of catalysts, possibly in the presence of non-hydrocarbon substances.

If the concentration of polymerisable material is low, the use of an active catalyst of the Friedel-Crafts type is found to be very suitable, for example, anhydrous aluminium halides or their complex derivatives containing hydrocarbons, boron trifluoride or its compounds or anhydrous hydrogen fluoride or double compounds containing this halogen acid. In the case of the simple halides, the action of the catalyst may sometimes be improved by the presence of a halogen hydracid. Aluminium halides, particularly the chloride, or double compounds thereof or solutions of these compounds are particularly suitable as catalysts for this reaction, but when using these compounds, a side reaction tends to give rise to a polymer containing combined halide, a part or all of which is split off as hydrogen halide on subsequent heating to temperatures appreciably above 100° C., and under conditions such that the solvent and unpolymerised material is distilled off from the polymer. The formation of this free hydrogen halide is objectionable as it may cause corrosion of the constructional materials of the apparatus, particularly in the case of steel equipment, and where live steam is used to assist the removal of volatile materials from the polymer.

It has already been proposed to polymerise liquids containing indene and coumarone in the presence of acid reacting catalysts, including metallic halides, for example aluminium chloride, and after polymerisation to separate spent catalyst and wash the polymer solution with water and treat with caustic soda solution in neutralising towers and tanks to remove any residual acidity due to traces of the catalyst. In one prior proposal, using as catalysts alkyl and aryl acid sulphates, neutralisation was carried out at elevated temperatures such as 100 to 110° C.

One difficulty experienced when working according to such proposals is in providing sufficiently adequate contact between the hydrocarbon liquid containing hydrogen halide and the solution or suspension of the alkaline substance, for these two liquids are not miscible. Agitation by means of a mechanically-operated stirring device of the two liquids in a vessel under pressure is a method which is not readily adaptable to the requirements of this process, for it is difficult to secure adequate contact between the hydrogen halide and the base, in fact the aqueous solution may form a lower layer while some of the acid may be in the form of vapour in the space above the hydrocarbon layer, which space may contain gaseous carbon dioxide.

It has been found, however, that the difficulties of this neutralisation step may be overcome according to the present invention which provides a method of removing the labile halogen in polymers produced by polymerisation, in solution, of a substance in the presence of a Friedel-Crafts type catalyst, such as aluminium chloride, comprising treating said polymer in solution, at a temperature at least sufficient to split off the halogen as hydrogen halide, with a solution or suspension, in a liquid vehicle, of a neutralising agent, preferably a mild alkali, for said hydrogen halide under a pressure sufficient to maintain liquid phase conditions and maintaining intimate contact between said polymer solution and said solution or suspension of the neutralising agent at that temperature until substantially all the labile halogen has been split off and neutralised.

We prefer to obtain the said intimate contact between the polymer solution and the solution or suspension of the neutralising agent by passing them together through a long narrow-bore tube; the said tube is preferably formed as a coil through which the two liquids are pumped. In the case of oil-soluble indene and/or coumarone resins we prefer to employ temperatures of 180° to 220° C.

This method of treatment ensures that there is sufficient contact of the hydrogen halide and the solution or suspension of the neutralising agent to cause very little, if any, corrosion of a tube made of mild steel. Moreover, a tube may be made in sections and it is a relatively simple and inexpensive matter to replace a part or all of the tube.

Suitable aqueous alkaline solutions can be made from alkali or alkaline earth metal hydroxides, carbonates or bi-carbonates.

The liquid used as the vehicle for the neutralising agent need not necessarily be immiscible with the polymer solution, as is the case when water is used as the vehicle, but it may be an organic liquid or a mixture of organic liquids, with or without water, which is either partly or wholly miscible with the polymer solution. The neutralisation stage may be carried out either continuously or semi-continuously.

After treatment in such a process the solution of the resin may be heated in the absence or presence of steam in order to free the polymer from unchanged material and solvent without fear of the formation of hydrogen halide.

The following examples illustrate the manner in which the invention may be carried into effect, the percentage figures quoted being calculated as percentages by weight.

Example 1

A solution of an indene resin containing 0.5% of combined hydrogen chloride, obtained by the polymerisation of an indene fraction with ferric chloride as catalyst, is pumped under a pressure of 15 atmospheres through a coil maintained at a temperature of 200° C. An equal volume of 5% aqueous solution of sodium hydroxide is pumped simultaneously through the coil at the same rate, the rate of pumping being adjusted so that the liquids are present in the heated zone for a period of one hour. The product is sepaarted and the resin solution is freed from traces of sodium hydroxide and sodium chloride by washing with water. The resin solution is found to be free of combined hydrogen chloride.

Example 2

A solution of a styrene-coumarone resin containing 0.25% of combined hydrogen chloride, obtained by the polymerisation of a benzole fraction with aluminium chloride as catalyst, is pumped through a coil with a 5% aqueous solution of sodium carbonate in a similar way to that described in Example 1. The temperature is maintained at 240° C. and the pressure at 30 atmospheres. The rate of pumping is adjusted so that the resin solution is present in the heated zone for 10 minutes. The product is freed from traces of alkaline materials and sodium chloride by washing with water and is found to be free of combined hydrogen chloride.

A similar procedure may also be used in the treatment of resin solutions containing traces of combined hydrogen fluoride or hydrogen bromide such as are, for example, obtained by the polymerisation of indene by the use of hydrogen fluoride, boron fluoride or aluminium bromide. The process is not limited to the treatment of solutions of polyindene but may also be applied to solutions of other relatively thermostable resins (e. g., polystyrene, polycoumarone or polypropylene), prepared by the use of the above-mentioned catalysts and containing small amounts of halogen compounds which decompose to yield the corresponding hydrogen halides.

What we claim is:

1. A method of removing the combined halogen from a polymer of the class consisting of polyindene, polycoumarone and polystyrene prepared by the action of a Friedel-Crafts type catalyst upon a solution of the monomer which comprises flowing a stream of a solution of said polymer in intimate admixture with a stream of an aqueous alkaline solution through a zone at a temperature between 180° C. and 240° C., in the liquid phase and maintaining said solution of polymer and said aqueous solution in intimate contact with one another under the said conditions until substantially the whole of the combined halogen has been split off from said polymer.

2. A method according to claim 1 wherein said intimate contact is achieved by utilising a high linear rate of flow of the admixed solutions through an elongated zone.

3. A method of removing the combined halogen from polyindene prepared by the action of a Friedel-Crafts type catalyst upon a solution of the monomer which comprises flowing a stream of a solution of polyindene in intimate admixture with a stream of an aqueous alkaline solution through a zone at a temperature between 180° C. and 240° C., in the liquid phase and maintaining said solution of polyindene and said aqueous solution in intimate contact with one another under the said conditions until substantially the whole of the combined halogen has been split off from said polyindene.

4. A method of removing the combined halogen from polystyrene prepared by the action of a Friedel-Crafts type catalyst upon a solution of the monomer which comprises flowing a stream of a solution of polystyrene in intimate admixture with a stream of an aqueous alkaline solution through a zone at a temperature between 180° C. and 240° C., in the liquid phase and maintaining said solution of polystyrene and said aqueous solution in intimate contact with one another under the said conditions until substantially the whole of the combined halogen has been split off from said polystyrene.

5. A method of removing the combined halogen from a coumarone-indene resin prepared by the action of a Friedel-Crafts type catalyst upon a solution of the monomer which comprises flowing a stream of a solution of said resin in intimate admixture with a stream of an aqueous alkaline solution through a zone at a temperature between 180° C. and 240° C., in the liquid phase and maintaining said solution of resin and said aqueous solution in intimate contact with one another under the said conditions until substantially the whole of the combined halogen has been split off from said resin.

6. A method of treating a polymer containing combined halogen formed by the polymerisation, in solution, of a compound selected from the group consisting of indene, coumarone and styrene in the presence of a Friedel-Crafts type catalyst, which comprises passing a solution of the polymer in intimate admixture with an aqueous alkaline solution through a zone which is heated to a temperature between 180° and 240° C. in the liquid state, until substantially all of the said combined halogen has been split off from the polymer.

7. A method of treating a polymer containing combined halogen formed by the polymerisation, in solution, of a compound selected from the group consisting of indene, coumarone and styrene in the presence of a Friedel-Crafts type catalyst, which comprises passing a solution of the polymer in intimate admixture with an aqueous solution of an alkali metal hydroxide through a zone which is heated to a temperature between 180° and 240° C. in the liquid state, until substantially all of the said combined halogen has been split off from the polymer.

8. A method of treating a polymer containing combined halogen formed by the polymerisation, in solution, of a compound selected from the group consisting of indene, coumarone and styrene in the presence of a Friedel-Crafts type catalyst, which comprises passing a solution of the polymer in intimate admixture with an aqueous solution of an alkali metal carbonate through a zone which is heated to a temperature between 180° C. and 240° C. in the liquid state, until substantially all of the said combined halogen has been split off from the polymer.

9. A method of treating a polymer containing combined halogen formed by the polymerisation, in solution, of a compound selected from the group consisting of indene, coumarone and styrene in the presence of a Friedel-Crafts type catalyst, which comprises passing a solution of the polymer in intimate admixture with an aqueous solution of an alkali metal bi-carbonate through a zone which is heated to a temperature between 180° and 240° C. in the liquid state, until substantially all of the said combined halogen has been split off from the polymer.

10. A method of treating a polymer containing combined halogen formed by the polymerisation, in solution, of a compound selected from the group consisting of indene, coumarone and styrene in the presence of a Friedel-Crafts type catalyst, which comprises pumping a solution of the polymer in intimate admixture with an aqueous alkaline solution under a pressure between 15 and 30 atmospheres through a zone which is heated to a temperature between 180 and 240° C. until all of the combined halogen has been split off from the polymer.

HERBERT MUGGLETON STANLEY.
FRANCIS EDWARD SALT.
JAMES FREDERICK WILLIAMS.

REFERENCES CITED

The following references are of record in the file of this patent:

UNITED STATES PATENTS

| Number | Name | Date |
|---|---|---|
| 1,404,389 | Hanna | Jan. 24, 1922 |
| 1,594,041 | Broderson | July 27, 1926 |
| 1,633,941 | Hey | June 28, 1927 |
| 1,752,921 | Miller | Apr. 1, 1930 |
| 2,340,413 | Cline et al. | Feb. 1, 1944 |
| 2,373,714 | Soday | Apr. 17, 1945 |